US012700280B2

(12) United States Patent
Zhang

(10) Patent No.: US 12,700,280 B2
(45) Date of Patent: Aug. 4, 2026

(54) HEATING ASSEMBLY AND AUTOMATIC MEALS-SELLING MACHINE

(71) Applicant: SHENZHEN CHAOYONG TIMES TECHNOLOGY CO., LTD., Shenzhen (CN)

(72) Inventor: Hengjie Zhang, Shenzhen (CN)

(73) Assignee: SHENZHEN CHAOYONG TIMES TECHNOLOGY CO., LTD., Shenzhen (CN)

( * ) Notice: Subject to any disclaimer, the term of this patent is extended or adjusted under 35 U.S.C. 154(b) by 246 days.

(21) Appl. No.: 18/604,218

(22) Filed: Mar. 13, 2024

(65) Prior Publication Data

US 2024/0221452 A1 Jul. 4, 2024

Related U.S. Application Data

(63) Continuation of application No. PCT/CN2022/113101, filed on Aug. 17, 2022.

(30) Foreign Application Priority Data

Oct. 15, 2021 (CN) ......................... 202111207153.X

(51) Int. Cl.
*G07F 9/10* (2006.01)
*G07F 17/00* (2006.01)

(52) U.S. Cl.
CPC ............ *G07F 17/0085* (2013.01); *G07F 9/10* (2013.01)

(58) Field of Classification Search
CPC ........................................................ G07F 11/10
See application file for complete search history.

(56) References Cited

U.S. PATENT DOCUMENTS 5,522,310 A * 6/1996 Black, Sr. ............... A47J 27/14 221/113
2014/0224826 A1* 8/2014 Otzen ..................... G07F 11/10 221/1

(Continued)

FOREIGN PATENT DOCUMENTS

CN 204946181 U 1/2016
CN 205507989 U 8/2016

(Continued)

OTHER PUBLICATIONS

First Office Action issued in counterpart Chinese Patent Application No. 202111207153.X, dated Dec. 2, 2024.

(Continued)

*Primary Examiner* — Gene O Crawford
*Assistant Examiner* — Ayodeji H Ojofeitimi
(74) *Attorney, Agent, or Firm* — Westbridge IP LLC

(57) ABSTRACT

Disclosed are a heating assembly and an automatic meals-selling machine. The heating assembly includes a vessel body, a cover body and a heating body, and the vessel body is provided with a space accommodating meals to be heated; the cover body is movably provided relative to the vessel body to cover or open the vessel body, and the cover body and the vessel body are configured to cover together to form a heating cavity; the heating body is provided at the vessel body and/or the cover body for achieving at least one of roasting heating, water-bath heating or steam heating; and one of the vessel body and the cover body is provided with a meals inlet to allow the meals pickup assembly put the meals into the one of the vessel body and the cover body via the meals inlet.

8 Claims, 8 Drawing Sheets

(56) References Cited

U.S. PATENT DOCUMENTS

| | | | | |
|---|---|---|---|---|
| 2016/0379434 | A1* | 12/2016 | Huang | G07F 17/0078 99/334 |
| 2019/0114868 | A1 | 4/2019 | Yu | |
| 2019/0318566 | A1* | 10/2019 | Karimi-Shirazia | A23L 5/10 |

FOREIGN PATENT DOCUMENTS

| | | | |
|---|---|---|---|
| CN | 207082171 | U | 3/2018 |
| CN | 108305390 | A | 7/2018 |
| CN | 207938116 | U | 10/2018 |
| CN | 207940447 | U | 10/2018 |
| CN | 208463626 | U | 2/2019 |
| CN | 109892969 | A | 6/2019 |
| CN | 209595522 | U | 11/2019 |
| CN | 111820566 | A | 10/2020 |
| CN | 113920651 | A | 1/2022 |
| CN | 113942693 | A | 1/2022 |
| CN | 113963483 | A | 1/2022 |
| CN | 220305852 | U | 1/2024 |
| GB | 861570 | A | 2/1961 |

OTHER PUBLICATIONS

International Search Report and Written Opinion issued in corresponding PCT Application No. PCT/CN2022/113101, dated Sep. 22, 2022.

* cited by examiner

HEATING ASSEMBLY AND AUTOMATIC MEALS-SELLING MACHINE

CROSS-REFERENCE TO RELATED APPLICATIONS

The present application is a continuation application of International Application No. PCT/CN2022/113101, filed on Aug. 17, 2022, which claims priority to Chinese Patent Application No. 202111207153.X, filed on Oct. 15, 2021. The disclosures of the above-mentioned applications are incorporated herein by reference in their entireties.

TECHNICAL FIELD

The present application relates to the technical field of meals-selling machines, in particular to a heating assembly and an automatic meals-selling machine.

BACKGROUND

Since most of the production processes of traditional delicious food are cumbersome and complicated, and it is difficult to carry out large-scale and standardized processing and sales, with the development of the times, labor costs and store rental costs are getting higher and higher, many traditional flavored delicious food have become increasingly rare, for example, it is reported that many old food restaurants in Hong Kong that have been operating for many years have closed due to high costs. In today's fast-paced lifestyle, automatic vending equipment is favored by people, but what is sold automatically is boxed fast food, and traditional flavored delicious food (such as marinated meat in baked bun, Chinese rolled dough and so on) are rarely introduced into automatic vending equipment. And fast food is generally heated by microwaves or a combination of microwaves and light waves, on the one hand, it has higher requirements for packaging materials, and the packaging materials are generally PP plastics, which are high in cost and pollute the environment; on the other hand, if the heating temperature of the above heating method is too high, it will produce substances that are harmful to human health.

SUMMARY

The main purpose of the present application is to propose a heating assembly, aiming to obtain a heating assembly of an automatic meals-selling machine that can use different heating methods for different meals and is healthier, environmentally friendly and low-cost.

In order to achieve the above purpose, the heating assembly proposed in the present application is applied to the automatic meals-selling machine for heating meals. The automatic meals-selling machine includes a casing and a meals pickup assembly provided in the casing, and the meals pickup assembly is configured to send the meals to the heating assembly. The heating assembly includes:

- a vessel body provided with a space accommodating meals to be heated;
- a cover body movably provided relative to the vessel body to cover or open the vessel body, and the cover body and the vessel body are configured to cover together to form a heating cavity;
- a heating body provided at the vessel body and/or the cover body for achieving at least one of roasting heating, water-bath heating or steam heating;
- one of the vessel body and the cover body is provided with a meals inlet to allow the meals pickup assembly put the meals into the one of the vessel body and the cover body via the meals inlet.

In an embodiment, in response to that the heating assembly adopts the roasting heating, the vessel body is formed with a heating tank, a tank wall of the heating tank is provided with the meals inlet, and the heating body is provided on a surface of the vessel body facing away from the heating tank and/or inside the cover body.

In an embodiment, the vessel body includes a bottom plate and a side plate provided at a periphery of the bottom plate, and the bottom plate and the side plate are enclosed to form the heating tank; the side plate is provided with the meals inlet, and the cover body includes a cover plate and a coaming plate provided at a periphery of the cover plate; the coaming plate is provided with an avoidance hole, and the cover body is configured to cover with the vessel body; the side plate correspondingly is configured to cover the avoidance hole, and the coaming plate is configured to correspondingly cover the meals inlet.

In an embodiment, in response to that the heating assembly adopts the steam heating or the water-bath heating, the vessel body is a tube structure with one end open, the heating body is provided at the vessel body, and the vessel body is filled with a certain capacity of water; the cover body is provided with a meals storage portion facing towards the vessel body, the meals storage portion is provided with the meals inlet, and the meals storage portion is provided above the water or immersed in the water.

In an embodiment, the cover body further includes a top cover, and the meals storage portion is a tube structure with one end open; the top cover is configured to cover and connect with a edge of a opening of the meals storage portion, and a circumferential side of the meals storage portion is provided with the meals inlet; and a height of the meals storage portion is smaller than a depth of the vessel body.

In an embodiment, a surface of the meals storage portion facing towards a bottom of the vessel body is provided with a plurality of micropores, and the plurality of the micropores are provided at intervals.

The present application further proposes an automatic meals-selling machine, including:

- a casing formed with a heating zone, a cold storage zone and an electronic control zone provided sequentially in a vertical direction;
- a meals storage rack provided in the cold storage zone and provided with a plurality of storage spaces;
- the heating assembly as described in any one of the above, and the heating assembly is provided at the heating zone;
- a meals pickup assembly movably provided between the cold storage zone and the heating zone to take out meals in the storage space and send the meals in the storage space into the heating assembly via the meals inlet for heating; and
- an electric control assembly provided at the electric control zone and electrically connected to both the heating assembly and the meals pickup assembly.

In an embodiment, the meals pickup assembly includes a meals storage piece and a meals push rod; the meals storage piece is vertically movable relative to the meals storage rack, and the meals push rod is telescopically provided at one side of the meals storage piece; in response to that the meals storage piece is flush with the meals inlet, the meals push rod is configured to push meals on the meals storage piece into the heating assembly via the meals inlet.

In an embodiment, the meals pickup assembly further includes a hole puncher, the hole puncher is fixed above the meals storage piece, and a surface of the hole puncher facing towards the meals storage piece is provided with a needle to punch a hole in a packaging box of the meals on the meals storage piece.

In an embodiment, a plurality of the meals storage racks are provided, and the plurality of the meals storage racks are arranged side by side in the cold storage zone at intervals; a plurality of the meals pickup assemblies are provided and are provided in one-to-one correspondence with the meals storage racks, a plurality of the heating assemblies are provided and are provided in one-to-one correspondence with the meals pickup assemblies; a heating method of the heating assembly is at least two of the roasting heating, the water-bath heating and the steam heating.

In an embodiment, the heating assembly further includes a supply portion, and the supply portion is provided at the electronic control zone and is connected to the vessel body and/or the cover body by a pipe or a wire to realize a heating function of the vessel body and/or a heating function of the cover body.

The heating assembly of the technical solution according to the present application is applied to the automatic meals-selling machine, different from the light waves heating method or microwaves heating method in the existing structures, the heating assembly includes a vessel body and a cover body, the vessel body and the cover body cooperate to form a closed heating cavity, the cover body is movably provided relative to the vessel body to cover or open the vessel body, the heating body can be provided at the vessel body and/or the cover body, heating the meals by at least one method of roasting heating, water-bath heating and steam heating can significantly reduce the requirements for the outer surface materials of meals and effectively reduce cost, and the temperature will not be too high when heated in this way, the heating methods can be adapted to different types of the flavored snacks and meals, thus satisfying the combination of traditional food and automatic selling, and expanding the application scenarios. At the same time, depending on the different heating methods, one of the vessel body and the cover body is provided with a meals inlet, which is convenient for the meals pickup assembly to put the meals into the heating cavity via the meals inlet to simplify the operation process.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

Figure 1:
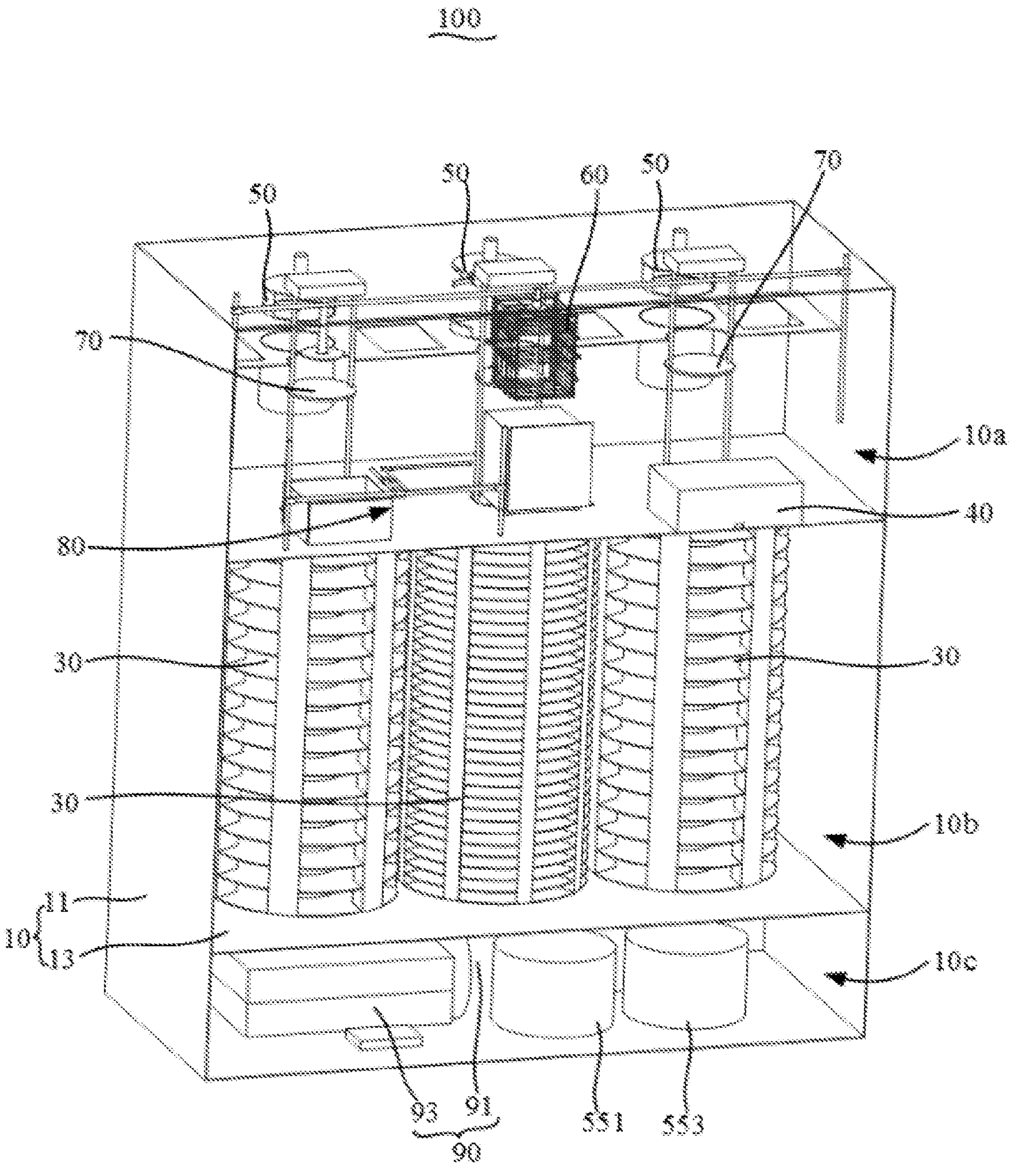
FIG. 1 is a structural schematic view of an automatic meals-selling machine according to an embodiment of the present application.

The realization of the purpose, functional features and advantages of the present application will be further described in conjunction with the embodiments and with reference to the accompanying drawings.

DETAILED DESCRIPTION OF THE EMBODIMENTS

The technical solutions in the embodiments according to the present application will be clearly and completely described below in conjunction with the accompanying drawings in the embodiments according to the present application, and it is clear that the described embodiments are only a part of the embodiments according to the present application, and not all of the embodiments. Based on the embodiments in the present application, all other embodiments in obtained by those of ordinary skill in the art without making creative labor fall within the scope of the present application.

It should be noted that in the embodiment of the present application, all directional indications (such as up, down, left, right, front, back or the like) are only used to explain the relative positional relationship, movement and so on between various components in a specific posture (as shown in the accompanying drawings). If the specific posture changes, the directional indication will also change accordingly.

In the present application, unless otherwise clearly stated and limited, the terms “connection”, “fixed” and so on should be understood in a broad sense. For example, “fixed” can be a fixed connection, a detachable connection or an integral body; it can be a mechanical connection or an electrical connection; it can be a direct connection or an indirect connection through an intermediate medium; it can be an internal connection between two components or the interaction between two components, unless otherwise expressly limited. For those of ordinary skill in the art, the specific meanings of the above terms in the present application can be understood according to the specific circumstances.

In addition, in the present application, if there are descriptions involving "first", "second" or the like, the descriptions of "first", "second" or the like are only for descriptive purposes and cannot be understood as indicating or implying the relative importance or implicitly indicating the quantity of the technical features indicated. Therefore, features defined as "first" and "second" may explicitly or implicitly include at least one of these features. In addition, the technical solutions of various embodiments can be combined with each other, but it must be based on that those of ordinary skill in the art can realize. When the combination of technical solutions is contradictory or cannot be realized, it should be considered that such combination of technical solutions does not exist and is not within the protection scope claimed by the present application.

The automatic selling machines currently on the market are generally fast food boxed meals or snacks. The present application proposes a heating assembly and an automatic meals-selling machine. The automatic meals-selling machine is mainly aimed at the automatic selling of traditional flavored snacks and meals, which comprehensively utilizes intelligent control modules and other methods to enable the classic traditional delicious food that the public loves to be passed down and make it convenient for users to eat authentic and affordable traditional delicious food. Here, traditional delicious food can be Chinese rolled dough, cold noodles, marinated meat in baked bun and various other handmade delicious food. Certainly, the automatic meals-selling machine can also be applied to automatic selling of fast food. Furthermore, by improving the heating assembly of the automatic meals-selling machine, the more environmentally friendly and low-cost automatic meals-selling machine is obtained.

Figure 5:
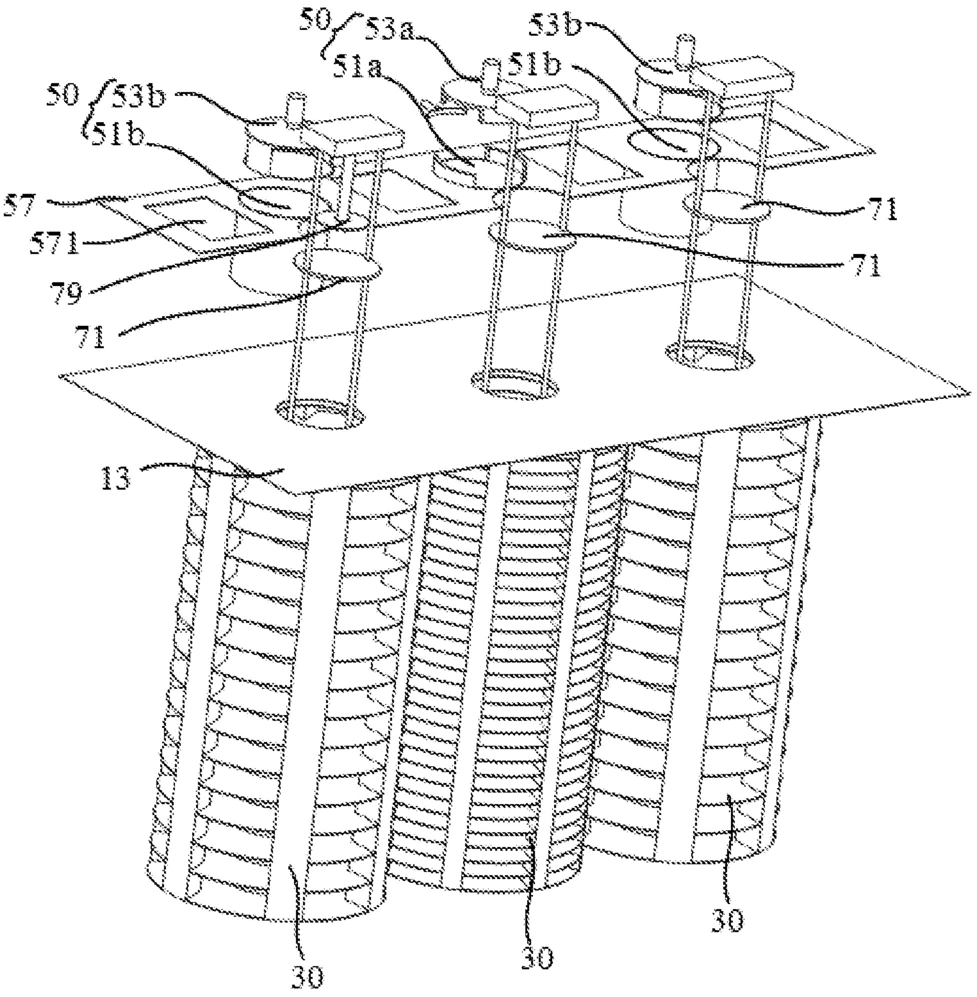
FIG. 5 is a structural schematic view of the meals storage rack, the meals pickup assembly and the heating assembly in the automatic meals-selling machine shown in FIG. 1.
Figure 6:
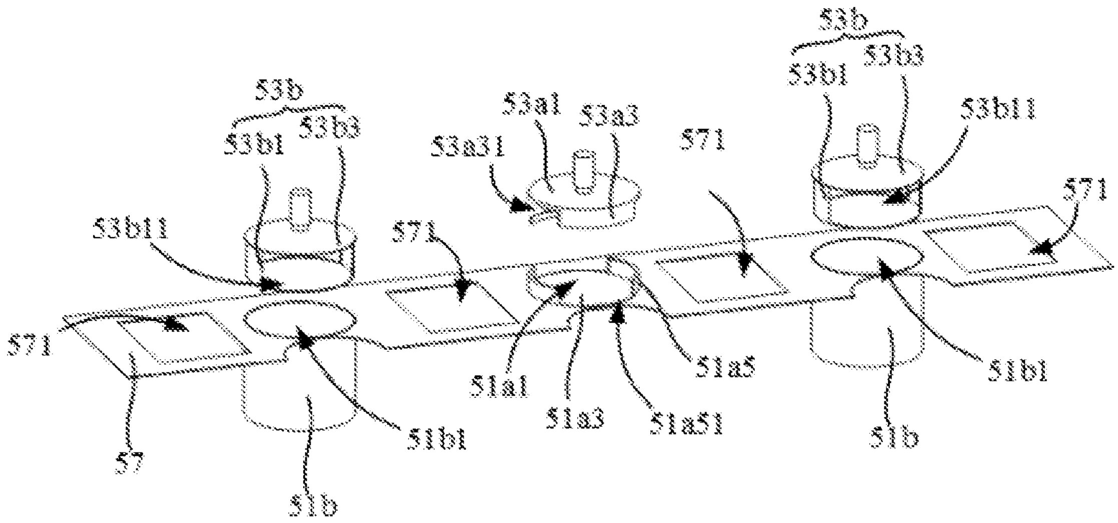
FIG. 6 is a structural schematic view of the heating assembly in the automatic meals-selling machine shown in FIG. 1.

Please refer to FIG. 5 and FIG. 6, the present application proposes a heating assembly, in order to adapt to traditional snacks, the heating assembly 50 provided in the automatic meals-selling machine 100 in the present application works in a manner different from the existing light waves or microwaves heating methods. The heating assembly 50 is configured for heating meals, the automatic meals-selling machine 100 includes a casing 10 and a meals pickup assembly 70 provided in the casing 10, and the meals pickup assembly 70 is configured to send the meals to the heating assembly 50. In an embodiment, the heating assembly includes a vessel body 51*a*, 51*b*, a cover body 53*a*, 53*b* and a heating body, the vessel body 51*a*, 51*b* is provided with a space accommodating a meals to be heated; the cover body 53*a*, 53*b* is movably provided relative to the vessel body 51*a*, 51*b* to cover or open the vessel body 51*a*, 51*b*, the cover body 53*a*, 53*b* and the vessel body 51*a*, 51*b* are configured to cover together to form a heating cavity; the heating body is provided at the vessel body 51*a*, 51*b* and/or the cover body 53*a*, 53*b* for achieving at least one of roasting heating, water-bath heating or steam heating; and one of the vessel body 51*a*, 51*b* and the cover body 53*a*, 53*b* is provided with a meals inlet 51*a*51, 53*b*11 to allow the meals pickup assembly 70 put the meals into the one of the vessel body 51*a*, 51*b* and the cover body 53*a*, 53*b* via the meals inlet 51*a*51, 53*b*11.

Please refer to FIG. 1 to FIG. 5, it can be understood that the automatic meals-selling machine 100 is generally placed in an office building or near an office building. Due to the special features of the meals of the automatic meals-selling machine 100 according to the present application, it can be configured as any one choice for breakfast, lunch and dinner for office workers. Certainly, the meals-selling machine can also be placed in shopping malls or other places in need, which is no limitation here. In this embodiment, the automatic meals-selling machine 100 includes the casing 10, the casing 10 includes the outer shell 11 and the partition plate 13 provided in the outer shell 11, and the outer shell 11 is formed with the accommodation space for protecting the components provided therein. Specifically, the outer shell 11 includes a bottom shell 117, a top shell and a side shell plate connecting the bottom shell 117 and the top shell. The structure of the side shell plate can be different depending on the shape of the outer shell 11, here, taking the shape of the outer shell 11 as a cuboid as an example, the bottom shell 117 and the top shell are both rectangular and are provided vertically on the ground to ensure the maximum surface area for storing meals. The side shell plate includes a front panel (not shown in figures), a rear panel 111, a left side plate 113 and a right side plate 115, the left side plate 113 and the right side plate 115 connect the front panel and the rear panel 111, the side shell plate facing towards the user is configured to be the front panel, the side shell plate opposite to the front panel is the rear panel 111, the user's left hand corresponds to the left side plate 113, and the user's right hand corresponds to the right side plate 115. Certainly, in other embodiments, the casing 10 can also be configured as a cylinder or an irregular shape to achieve a certain aesthetic effect. In order to facilitate the assembly of internal components, the outer shell 11 can be a detachably connected split structure, for example, the bottom shell 117 and the top shell are detachably connected to the side shell plate respectively, or the front panel is detachably connected to the left side plate 113 and the right side plate 115, and the connection method can be at least one of snap connection, thread connection or plug connection to facilitate maintenance and cleaning.

It can be understood that in order to put the meals into the meals storage rack 30 in the casing 10 before selling, the casing 10 needs to have a meals storage door (not shown in figures), the meals storage door can be the front panel or the rear panel 111, and the meals storage door can be a whole body and is connected to the left side plate 113 or the right side plate 115 by rotating on one side; or the meals storage door can be a two-split structure, the two split bodies are rotatably connected to the left side plate 113 and the right side plate 115 respectively, thereby rotating the meals storage door to open the meals storage door and place the meals on the meals delivery rack. Certainly, in order to facilitate users to pick up meals, a meals outlet (not shown in figures) is provided on the front panel. Here, the material of the casing 10 can be metal or alloy, for example, iron, stainless steel, aluminum, etc., which has high structural strength, good corrosion resistance and a certain dead weight to ensure the stability of the automatic meals-selling machine 100. Certainly, the material of the casing 10 can also be other materials such as wood or plastic, which is not limited here. In an embodiment, one side of the outer shell 11 is a meals storage door, and a meals outlet is provided on the meals storage door. It can be understood that providing the front panel as the meals storage door, which is different from the existing panel that faces away from the meals outlet as a side where the meals are placed, can make all the internal structures install on the partition plate 13, the rear panel 111, the left side plate 113 and the right side plate 115, the structure is more compact, and the cooperation relationship of the meals pickup assembly 70 will not be affected because of frequent opening and closing of the meals storage door.

The partition plate 13 is connected to an inner wall of the outer shell 11. Specifically, two partition plates 13 are provided, and the two partition plates 13 are provided at intervals in the vertical direction, thereby dividing the accommodation space into a heating zone 10*a*, a cold storage zone 10*b* and an electronic control zone 10*c*, achieving segmentation of different zone, so that it can prevent the work and performance of various components from being affected, and improve the safety and efficiency of the overall structure. The meals storage rack 30 is placed at the cold storage zone 10*b*, and its storage space 30*a* is configured to place meals, when opening the meals storage door, the meals can be put into the storage space 30*a* one by one, and the meals are located in the cold storage zone 10*b*, which can achieve the purpose of keeping the meals refrigerated and fresh, thus improving the user's taste. The heating zone 10*a* is an zone for heating meals, the heating zone 10*a* is provided with a heating assembly 50, and the heating assembly 50 is configured to heat meals refrigerated in the cold storage zone 10*b*. The structure of the heating assembly 50 is different depending on different meals, for example, the heating assembly 50 can be roasting heating, water-bath heating, steam heating, etc., which can further improve the taste of meals and the user experience of freshly made and sold. The electronic control zone 10*c* is configured to provide the electric control assembly 90, such as the controller 93, battery or other electrical components, which can be electrically connected to the heating assembly 50 and the meals pickup assembly 70, thereby controlling them to realize various functions and ensuring the automatic operation function of the automatic meals-selling machine 100. Certainly, in order to realize the refrigeration function, a compressor 91 is also provided in the electronic control zone 10*c*. The electronic control zone 10*c* is provided at one end away from the heating zone 10*a*, which can also avoid being affected by overheating and improve safety. The function of the meals pickup assembly 70 is to move to the corresponding storage space 30*a* under the control program to obtain the meals, and then transport the meals to the heating zone 10*a* for heating, thus, the meals pickup assembly 70 moves back and forth between the cold storage zone 10*b* and the heating zone 10*a*. Certainly, depending on actual needs, more than two partition plates 13 can be further provided to form more independent spaces.

In this embodiment, the heating assembly 50 includes a vessel body 51*a*, 51*b*, which is fixed to the heating zone 10*a* of the casing 10, specifically, the vessel body 51*a*, 51*b* is provided with a space accommodating a meals to be heated; the cover body 53*a*, 53*b* is movably provided at the outer shell 11, thus the cover body 53*a*, 53*b* is movably provided relative to the vessel body to cover or open the vessel body 51*a*, 51*b*. According to different heating methods, the heating body can be provided at the vessel body 51*a*, 51*b* and/or the cover body 53*a* and can heat meals. The vessel body 51*a*, 51*b* can be fixedly connected to the outer shell 11, for example, to the side shell plate, so that a certain distance is provided between the vessel body 51*a*, 51*b* and the partition plate 13, thus preventing excessive heat transfer to the cold storage zone 10*b*, and improving the cold storage effect of the cold storage zone 10*b*. When the cover body 53*a*, 53*b* covers with the vessel body 51*a*, 51*b*, the cover body 53*a*, 53*b* and the vessel body 51*a*, 51*b* cooperate to form a heating cavity, which triggers the heating of the meals placed in it. The movable setting of the cover body 53*a*, 53*b* can be realized by providing a driving cylinder, in an embodiment, a surface of the cover body 53*a*, 53*b* facing away from the vessel body 51*a*, 51*b* is connected to a piston body of the driving cylinder, the driving cylinder is fixed on the top shell and can realize the up and down reciprocating movement under the driving of the driving cylinder. Certainly, the driving cylinder can also be an electric motor or motor, etc., which can be connected with a transmission part that converts rotational motion into linear motion.

Here, the heating body is configured to realize at least one of roasting heating, water-bath heating and steam heating, and the corresponding heating method can be selected according to the different heated meals. For example, when the meals in the meals storage rack 30 are marinated meat in baked bun, the meat and baked bun can be placed separately or directly sandwiched together because the best taste of the cake is crispy, here, the heating method of the heating assembly 50 is chosen as roasting heating to improve the taste. When the meals in the meals storage rack 30 is cold noodles or Chinese rolled dough, since the cold noodles or Chinese rolled dough itself is eaten cold, there is no need for excessive heating temperatures, because the refrigerated dough will become slightly harder and affect the taste, therefore, the steam heating method is chosen, it only needs to be heated slightly to warm the cold noodles or Chinese rolled dough up to improve the taste and avoid being too cold to affect digestion at the same time. When the meals are porridge or soup, in order to avoid overdrying or insufficient heating temperature, the heating method is set to water-bath heating to increase the heating temperature without losing the original taste of the meals.

Here, the heating assembly 50 is applied to the automatic meals-selling machine 100, different from the light waves heating method or microwaves heating method in the existing structures, the heating body of the heating assembly 50 heats the meals by at least one method of roasting heating, water-bath heating and steam heating, which can significantly reduce the requirements for the outer surface materials of meals and effectively reduce cost; and the temperature will not be too high when heated in this way, the heating methods can be adapted to different types of the flavored snacks and meals, thus satisfying the combination of traditional food and automatic selling, and expanding the application scenarios. At the same time, depending on the different heating methods, one of the vessel body 51*a*, 51*b* and the cover body 53*a*, 53*b* is provided with a meals inlet 51*a*51, 53*b*11, which is convenient for the meals pickup assembly 70 to put the meals into the heating cavity via the meals inlet 51*a*51, 53*b*11 to simplify the operation process.

Please refer to FIG. 6, in an embodiment, in response to that the heating assembly 50 adopts the roasting heating, a tank wall of the heating tank 51*a*1 is provided with the meals inlet 51*a*51, and the heating body is provided on a surface of the vessel body 51*a* facing away from the heating tank 51*a*1.

In this embodiment, when the heating method is roasting heating, the vessel body 51*a*, 51*b* is formed with the heating tank 51*a*1. For example, the heating assembly 50 can be a device of electric baking pan type, and the heating body is a resistance module, such as a resistance wire or an electromagnetic heating structure, which is provided at the surface of the vessel body 51*a* facing away the heating tank 51*a*1; after being powered on, the resistor generates heat and transfers the heat to the vessel body 51*a*, so that the heating tank 51*a*1 generates heat to heat the meals. Since the heating body of this heating method is provided on the surface facing away the heating tank 51*a*1, a meals inlet 51*a*51 is opened on the tank wall of the heating tank 51*a*1, so that the meals can directly enter the heating tank 51*a*1 via the meals inlet 51*a*51 and be closer to the heating element, thereby improving the heating effect. Under normal circumstances, the cover body 53*a* can be provided away from the vessel body 51*a*, and a sensor can be provided, when it is detected that the meals pickup assembly 70 transports the meals flush with the meals inlet 51*a*51, moving the meals into the heating tank 51*a*1, then controlling the cover body 53*a* to cover the heating tank 51*a*1, thereby triggering the heating body to generate heat. Since the roasting heating heats up quickly, the heating time here should not be too long, the optional range is 1 minute to 2 minutes to ensure a better taste. Certainly, in order to ensure the hygiene of meals, aluminum foil and other materials can be used outside the meals for packaging. Aluminum foil can be heated directly and will not produce harmful substances, thus effectively improving food safety. Certainly, according to needs, heating bodies can also be provided on both the vessel body 51*a* and the cover body 53*a*, thereby achieving double-sided heating and better heating effect.

Please continue to refer to FIG. 6, in an embodiment, the vessel body 51*a* includes a bottom plate 51*a*3 and a side plate 51*a*5 provided at a periphery of the bottom plate 51*a*3, and the bottom plate 51*a*3 and the side plate 51*a*5 are enclosed to form the heating tank 51*a*1. The side plate 51*a*5 is provided with the meals inlet 51*a*51, and the cover body 53*a* includes a cover plate 53*a*1 and a coaming plate 53*a*3 provided at a periphery of the cover plate 53*a*1. The coaming plate 53*a*3 is provided with an avoidance hole 53*a*31, and the cover body 53*a* is configured to cover with the vessel body 51*a*. The side plate 51*a*5 correspondingly is configured to cover the avoidance hole 53*a*31, and the coaming plate 53*a*3 is configured to correspondingly cover the meals inlet 51*a*51.

In this embodiment, in order to simplify the structure, the vessel body 51*a* includes the bottom plate 51*a*3 and the side plate 51*a*5 provided at the periphery of the bottom plate 51*a*3. The shape of the vessel body 51*a* is disc-shaped and matches the shape of the meals of bun and cake types to be heated, and the cover body 53*a* includes the cover plate 53*a*1 and the coaming plate 53*a*3. The shape of the cover plate 53*a*1 matches the shape of the bottom plate 51*a*3, so that the shape of the side plate 51*a*5 also matches the shape of the coaming plate 53*a*3, thus ensuring that the side plate 51*a*5 covers with the coaming plate 53*a*3. Here, a meals inlet 51*a*51 is provided on the side plate 51*a*5. Specifically, the meals inlet 51*a*51 extends directly from the edge of the side plate 51*a*5 away from the bottom plate 51*a*3 to the periphery of the bottom plate 51*a*3 in the vertical direction, thereby maximizing the depth of the meals inlet 51*a*51. The width of the meals inlet 51*a*51 can be set to match the size of the meals to be heated, so as to ensure that the meals smoothly enters the heating tank 51*a*1, thereby improving the heating efficiency. At the same time, in order to achieve closed heating, when the cover body 53*a* is covered with the vessel body 51*a*, the coaming plate 53*a*3 can cover the meals inlet 51*a*51 to prevent heat loss, thus improving heating effect. In order to further ensure the sealing of the cover, an avoidance hole 53*a*31 is opened at the position of the coaming plate 53*a*3 corresponding to the side plate 51*a*5. In this way, when covered and heated, the coaming plate 53*a*3 can be inserted into the meals inlet 51*a*51, and the side plate 51*a*5 can be inserted into the avoidance hole 53*a*31, thereby, the coaming plate 53*a*3 and the side plate 51*a*5 are on the same circumferential surface, further preventing heat loss and improving the heating effect.

Certainly, in other embodiments, the vessel body 51*a* can also be in a plate shape without providing side plates 51*a*5, the coaming plate 53*a*3 does not need to open a hole, and the effect of closed heating can also be achieved.

Please refer to FIG. 6 again, in an embodiment, in response to that the heating assembly 50 adopts the steam heating or the water-bath heating, the vessel body 51*b* is a tube structure with one end open, the heating body is provided at the vessel body 51*b*, and the vessel body 51*b* is filled with a preset capacity of water. The cover body 53*b* is provided with a meals storage portion 53*b*1 facing towards the vessel body 51*b*, the meals storage portion 53*b*1 is provided with the meals inlet 53*b*11, and the meals storage portion 53*b*1 is provided above the water or immersed in the water.

In this embodiment, water can be heated into hot water by a resistance or an electromagnetic heating body, thereby achieving steam heating or water-bath heating to make heated meals taste better in a targeted manner and reduce heating costs. Here, it is mainly aimed at the meals of cold noodles or Chinese rolled dough type, which need to be kept soft and with a little humidity, so steam heating can be used. Specifically, the vessel body 51*b* has the tube structure with one end open, the water is contained in the vessel body 51*b*, that is, the vessel body 51*b* holds water, so that more hot water can be accommodated for heating. The water is heated into hot water by the heating pipe, which can produce water vapor, or introducing the hot water into the vessel body 51*b* directly. Therefore, correspondingly, the meals inlet 53*b*11 is provided on the cover body 53*b*, that is, the cover body 53*b* faces towards the meals storage portion 53*b*1 of the vessel body 51*b*, the meals storage portion 53*b*1 is not only provided with the meals inlet 53*b*11, but also provided with a space for holding meals. When the meals storage portion 53*b*1 is placed in the vessel body 51*b*, the surface of the meals storage portion 53*b*1 facing towards the hot water is provided in isolation from the hot water, that is, it is located above the hot water to achieve steam heating. When aiming at the meals of porridge or soup type, the storage portion 53*b*1 can be immersed in hot water, so that the meals are heated in the heat exchange with the hot water. Certainly, here, the meals all have packaging boxes, the packaging boxes here can be made of ordinary plastic, the material cost is low, which can effectively save production costs.

Different from the heating assembly 50 structure of the roasting heating method, in an embodiment, the cover body 53*b* further includes a top cover 53*b*3, and the meals storage portion 53*b*1 is a tube structure with one end open. The top cover 53*b*3 is configured to cover and connect with a edge of a opening of the meals storage portion 53*b*1, and a circumferential side of the meals storage portion 53*b*1 is provided with the meals inlet 53*b*11. A height of the meals storage portion 53*b*1 is smaller than a depth of the vessel body.

In this embodiment, the cover body 53*b* includes the top cover 53*b*3 and the meals storage portion 53*b*1, the structure of the meals storage portion 53*b*1 is also a tube structure, the meals inlet 53*b*11 is provided at the circumferential side, the top cover 53*b*3 is covered with and fixedly connected to the opening of the meals storage portion 53*b*1, thus forming a space for placing meals. In this way, when in use, the cover body 53*b* is away from the vessel body 51*b*; when the meals storage piece 71 moves to a position flush with the meals inlet 53*b*11, pushing the meals from the meals storage piece 71 into the cover body 53*b* by the meals push rod; when the cover body 53*b* detects the presence of meals, it can trigger the driving component to drive itself to move downward and cover with the opening of the heating tank 51*b*1 to trigger heating. Certainly, in order to achieve the steam heating, the height of the storage portion 53$b$1 is smaller than the depth of the vessel body 51$b$, thereby ensuring sufficient hot water storage and providing a better heating effect.

Certainly, for steam heating and water-bath heating, in order to facilitate processing, the structures of the heating assembly 50 of the steam heating method and water-bath heating method can be provided to be the same, and only the depth of water introduced into the vessel body 51$b$ is different, that is, the vessel body 51$b$ of steam heating has a water line of lower water level so that the packaging box of the meals does not come into contact with water, while the vessel body 51$b$ of water-bath heating is provided with a water line of higher water level so that the packaging box of meals can enter in water. At the same time, the temperature of steam heating should not be too high, and a temperature detection module can be provided to keep the steam temperature at about 100° C., such as 105° C.; the heating duration can be set at 1 minute to 2 minutes, which can make the meals have a better taste. The duration of the water-bath heating should not be too long, just keep it at 2 minutes to 3 minutes, so that the meals are hot but not very hot, thus obtaining a better eating experience.

Please refer to FIG. 6, in an embodiment, a surface of the meals storage portion 53$b$1 facing towards a bottom of the vessel body 51$b$ is provided with a plurality of micropores, and the plurality of the micropores are provided at intervals.

In this embodiment, in order to improve the heating effect, the surface of the meals storage portion 53$b$1 facing towards the bottom of the vessel body 51$b$ is provided with the plurality of micropores, and the plurality of the micropores are provided at intervals. When performing water-bath heating, the setting of multiple micropores can increase the contact area between meals and hot water, thereby improving heating efficiency. When the heating is completed, when the cover body 53$b$ moves upward and away from the hot water, the water in the meals storage portion 53$b$1 can also be drained out via the micropores, thus facilitating the smooth movement of the cover body 53$b$, reducing water spillage, improving the functional stability of the heating assembly 50, and reducing the impact on other components. The size and shape of the micropore can be set according to actual needs and are not limited here.

Please combine FIG. 1 and FIG. 6, certainly, when the heating assembly 50 is working, in order to ensure the smooth implementation of the function of the heating assembly 50, the heating assembly 50 further includes a supply portion. The supply portion is provided at the electronic control zone 10$c$ and is connected to the vessel body 51$b$ by a pipe or a wire to realize a heating function of the vessel body 51$b$.

In this embodiment, the supply portion varies according to different heating method. For example, when the heating method is roasting heating, the supply portion is a battery component or a circuit component and is connected to the roasting module provided at the vessel body 51$b$ by the wire, and the circuit can be opened and closed under the control of the controller 93, thus achieving the power on or power off of the roasting module, thereby achieving the heating of the vessel body 51$b$. When the heating method is water-bath heating or steam heating, the supply portion can be a water tank 551 and a heating pipe, the water tank 551 is provided at the electronic control zone 10$c$ and is passed into the vessel body 51$b$ by the pipe. The heating pipe can be provided in the water tank 551 or provided in the vessel body 51$b$, so as to achieve the heating of the water and convert the water into hot water for heating. The supply portion is also electrically connected to the controller 93, thereby achieving the effect of automatically controlled heating and ensuring smooth meals storage.

In addition, because of that the packaging box with meals will be directly submerged in the water in the heating assembly 50 of the water-bath heating method, causing certain pollution to the water, the heating assembly 50 can be set to have a self-cleaning function. For example, the vessel body 51$b$ is further connected to a drain pipe extending to the electronic control zone 10$c$, a sewage tank 553 is provided in the electronic control zone 10$c$, the vessel body 51$b$ is automatically cleaned during the idle time of the automatic meals-selling machine 100 by the control of the controller 93, that is, opening the drain pipe to allow the internal water to flow into the sewage tank 553, and then closing the drain pipe and opening the water inlet pipe to add clean water to the vessel body 51$b$. The automatic cleaning time can be from 1 o'clock to 5 o'clock in the morning to reduce the impact on meals sales.

Please refer to FIG. 1 to FIG. 4, the present application further proposes an automatic meals-selling machine. In an embodiment according to the application, the automatic meals-selling machine 100 includes a casing 10, a meals storage rack 30, a heating assembly 50, a meals pickup assembly 70 and an electric control assembly 90. The casing 10 is formed with a heating zone 10$a$, a cold storage zone 10$b$ and an electronic control zone 10$c$ provided sequentially in the vertical direction; the meals storage rack 30 is provided in the cold storage zone 10$b$; the heating assembly is provided at the heating zone 10$a$; the meals pickup assembly 70 is movably provided between the cold storage zone 10$b$ and the heating zone 10$a$, the meals pickup assembly 70 takes out meals in the storage space 30$a$ and sends the meals in the storage space into the heating assembly 50 for heating; and the electric control assembly 90 is provided at the electric control zone 10$c$ and electrically connected to both the heating assembly 50 and the meals pickup assembly 70. The specific structure of the heating assembly 50 refers to any of the above embodiments, and the functions brought about by this will not be described again here.

The structure of the casing 10 of the automatic meals-selling machine 100 also refers to the above-mentioned structure and will not be described in detail here.

In an embodiment, the meals storage rack 30 is provided with a plurality of storage spaces 30$a$ evenly arranged in the circumferential direction and axial direction, and the meals pickup assembly 70 is partially provided at the middle of the meals storage rack 30. Specifically, the meals storage rack 30 includes a plurality of storage spaces 30$a$, the plurality of the storage spaces 30$a$ are provided sequentially in the circumferential direction of the meals storage rack 30 and the axial direction of the meals storage rack 30, so that the storage space 30$a$ of the meals storage rack 30 formed is provided in a ring shape. For convenience in placing meals and picking up meals, meals are usually not stored in the middle part, the space in this part is not fully utilized, the partial structure of the meals pickup assembly 70 is provided in the middle of the meals storage rack 30, thus reducing the space occupied by the meals pickup assembly 70, rationally using the free space, thereby reducing the lateral surface area of the automatic meals-selling machine 100, and reducing the occupation of horizontal space. In addition, in order to facilitate the placement of meals, the outer circumferential surface of the meals storage rack 30 is connected with the accommodation space, that is, the storage space 30$a$ is connected with the cold storage zone 10$b$; when the meals storage door is open, meals can be placed via the opening connecting the storage space 30*a* and the cold storage zone 10*b*.

The automatic meals-selling machine 100 of the technical solution according to the present application includes the casing 10, the casing 10 is formed with the heating zone 10*a*, the cold storage zone and the electronic control zone 10*c* in the vertical direction, the heating assembly 50 is provided at the heating zone 10*a*, the meals storage rack 30 is provided at the cold storage zone, and the electric control assembly 90 is provided in the electronic control zone 10*c*. The cold storage zone 10*b* can keep the meals refrigerated and stored at the appropriate temperature, thus ensuring the freshness of the meals, the heating zone 10*a* is configured to heat the meals and is located above the cold storage zone 10*b*. According to the principle of heat moving upward, it can reduce the temperature impact on the cold storage zone 10*b* and save energy; at the same time, it can also stay away from the electric control assembly 90 and improve the usage performance of the electric control assembly 90. The overall layout of the casing 10 can make the internal space more regular, effectively reducing the expansion of the automatic meals-selling machine 100 in the lateral direction, thus reducing the cross-sectional area and reducing the occupation of the ground. At the same time, the meals storage rack 30 is provided with the plurality of storage spaces 30*a* evenly arranged along the circumferential direction and the axial direction for storing meals, thereby ensuring the storage capacity on the premise of saving space. The partial structure of the meals pickup assembly 70 is provided at the middle of the meals storage rack 30, thereby rationally utilizing the space where meals are not stored, reducing the occupation of additional space in the horizontal direction, further reducing the overall volume of the automatic meals-selling machine 100, and effectively saving space while ensuring the storage capacity of meals.

Figure 3:
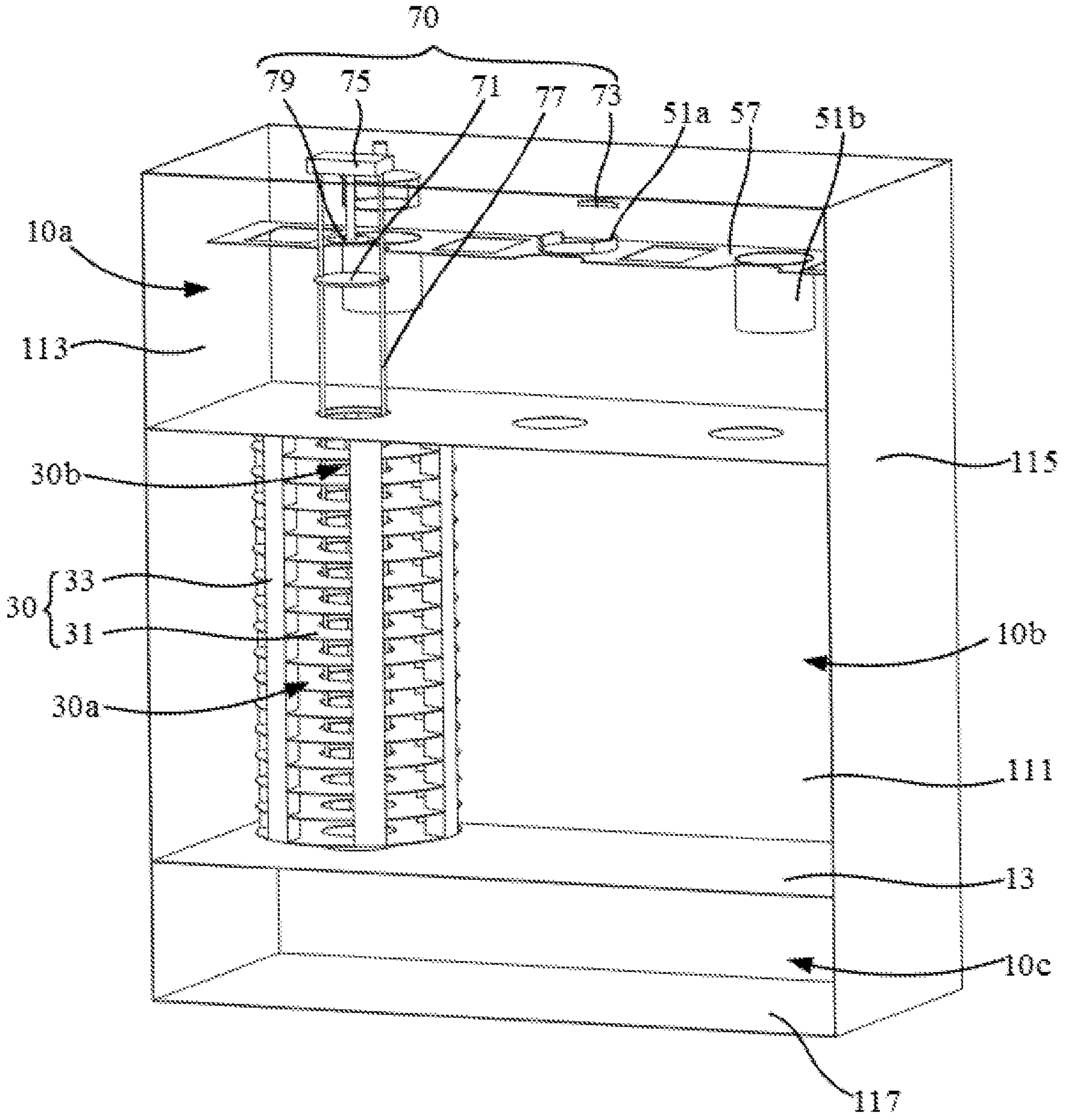
FIG. 3 is a structural schematic view of a casing, a meals storage rack, a meals pickup assembly and a heating assembly in the automatic meals-selling machine shown in FIG. 1.
Figure 4:
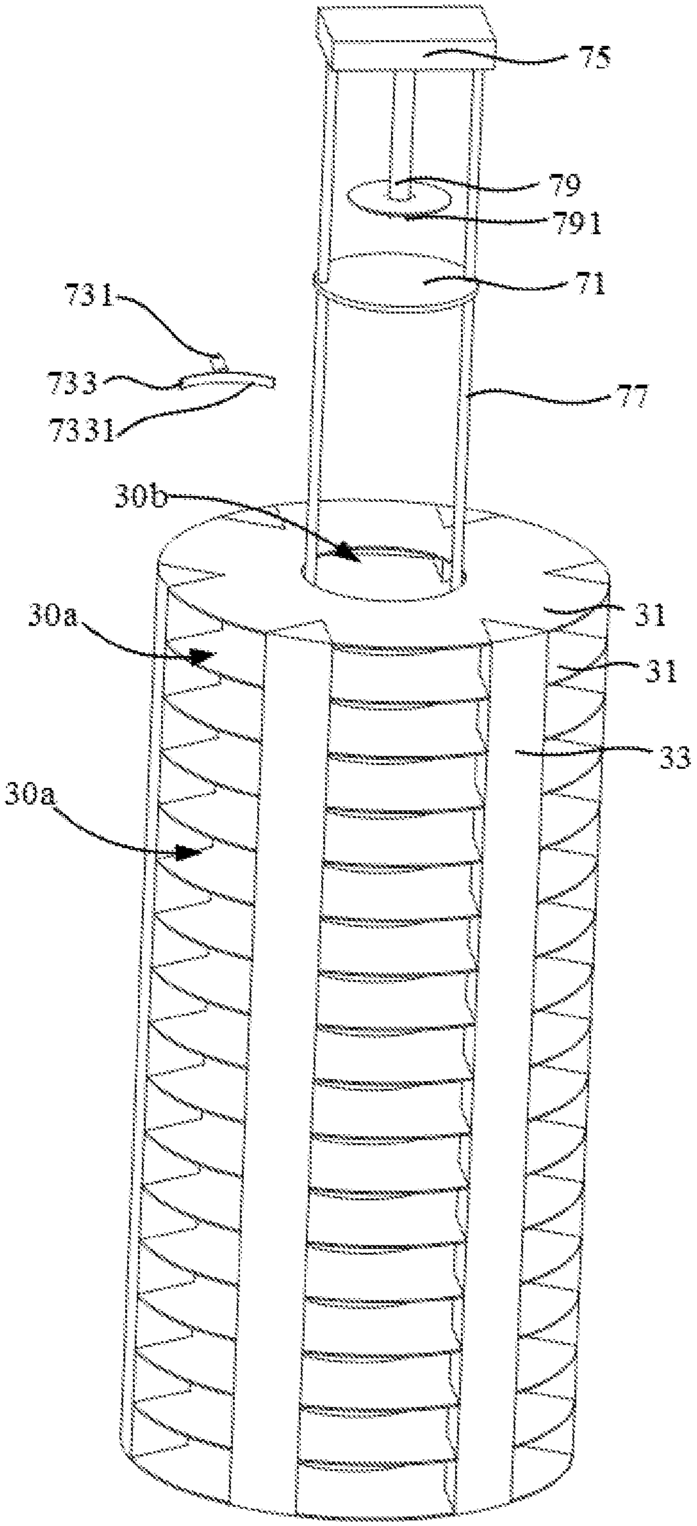
FIG. 4 is a structural schematic view of the meals storage rack and the meals pickup assembly in the automatic meals-selling machine shown in FIG. 1.

Please continue to refer to FIG. 3 and FIG. 4, in an embodiment, in order to reduce the difficulty of picking up meals, the meals pickup assembly 70 includes a meals storage piece 71 and a meals pushing piece 73, and the meals storage piece 71 is in the shape of a plate or a flat plate for placing meals. The meals storage piece 71 is provided in a meals pickup passage 30*b*, so the meals storage piece 71 matches the space shape of the meals pickup passage 30*b*, and the meals storage piece 71 is disk-shaped or triangular disk-shaped. The meals pickup passage 30*b* is connected with the storage space 30*a*, that is, the meals can enter the meals storage piece 71 in the meals pickup passage 30*b* from the storage space 30*a*. The meals pushing piece 73 is provided at an opening side of the storage space 30*a* away from the meals pickup passage 30*b*, and can be telescopically moved. When it is necessary to pick up a meals, the meals pushing piece 73 is able to stretch and extend into the storage space 30*a* via the opening of the storage space 30*a* facing away from the meals pickup passage 30*b* to push the meals onto the meals storage piece 71 to complete the meals pickup.

In an embodiment, in order to further simplify the structure, the meals pushing piece 73 is fixed on the inner wall of the casing 10, for example, on the side shell plate, the meals pushing piece 73 is movably provided in the vertical direction and then can move to a position corresponding to a different storage space 30*a*. When the meals storage piece 71 is also flush with the storage space 30*a* correspondingly, the meals can be pushed onto the meals storage piece 71 to complete the meals pickup of the meals of the storage space 30*a* located on different layers in one vertical direction, thus reducing the usage of the meals pushing piece 73, further reducing the occupation of space, simplifying the structure, and reducing the volume.

In an embodiment, in order to further facilitate picking up meals and placing meals, the meals storage rack 30 is provided to be rotatable circumferentially relative to the casing 10. In this way, when the meals pickup assembly 70 is automatically picking up meals, it is also possible to realize the meals pickup of the meals at different layers and the meals pickup of the meals at different positions on the same layer by the rotating of the meals storage rack 30 and only providing one meals pushing piece 73, thus further reducing the setting of meals pushing piece 73, reducing the occupation of lateral space, and further more reducing the volume of the automatic meals-selling machine 100.

Please refer to FIG. 3 and FIG. 4 again, in an embodiment, the meals storage piece 71 is disc-shaped to facilitate the rotation of the meals storage rack 30. In this embodiment, in order to realize the movement of the meals storage piece 71 in the vertical direction, the meals pickup assembly 70 further includes a first driving member 75 and two screw rods 77. Here, taking the first driving member 75 as a motor as an example, the first driving member 75 can be installed on the top shell, the screw rod 77 penetrates the heating zone and the cold storage zone 10*b*, the meals storage piece 71 and the screw rod 77 are threaded and connected. When the two screw rods 77 rotate forward synchronously, the meals storage piece 71 is driven to move downward; when the motor is reversed, the meals storage piece 71 is driven to move upward, and the meals is sent to the heating assembly 50 for heating processing. The setting of the meals pickup assembly 70 of this structure can effectively improve the stability of the movement of the meals storage piece 71, and the transmission of the screw rod 77 makes the moving position of the meals storage piece 71 more precise, thereby ensuring the success rate of picking up meals. Certainly, structural transmission such as transmission belts or chains can also be provided.

On the structural basis of the first driving member 75, in order to realize the movement and telescoping of the meals pushing piece 73, the meals pickup assembly 70 further includes a second driving member. Here, the meals pushing piece 73 is set to include a connecting head 731 and a pushing portion 733, the connecting head 731 is columnar and is connected to the driving shaft of the second driving member, and the pushing portion 733 is connected to one end of the connecting head 731 away from the second driving member. Since the automatic meals-selling machine 100 according to the present application is mainly aimed at traditional flavored snacks, such as marinated meat in baked bun, cold noodles or the like, the packaging structure is generally in a round shape, thus, the surface of the pushing portion 733 facing towards the meals storage rack 30 is provided as a curved surface 7331, which can well wrap the outer edge of the meals, thereby ensuring that the meals enters the meals storage piece 71 smoothly.

Please refer to FIG. 4, in an embodiment, the meals storage rack 30 includes a storage tray 31 and a support bar 33, the setting of the storage tray 31 can ensure the stability of meals placement and prevent it from falling. The specific shape of the storage tray 31 may be circular, which matches the cylindrical meals pickup passage 30*b*, thereby increasing the volume of each storage space 30*a*. According to the automatic selling equipment of normal size, in order to ensure the storage capacity of meals, and according to the volume of meals, at least two storage trays 31 should be provided. In an embodiment, the number of storage trays 31 is 10 to 32, so as to ensure a large storage capacity to improve the purchasing experience. The support bar 33 is provided to separate at least two storage trays 31 to form a storage space 30*a* for placing meals, and connect the plurality of storage trays 31 into one for convenient meals pickup.

Figure 2:
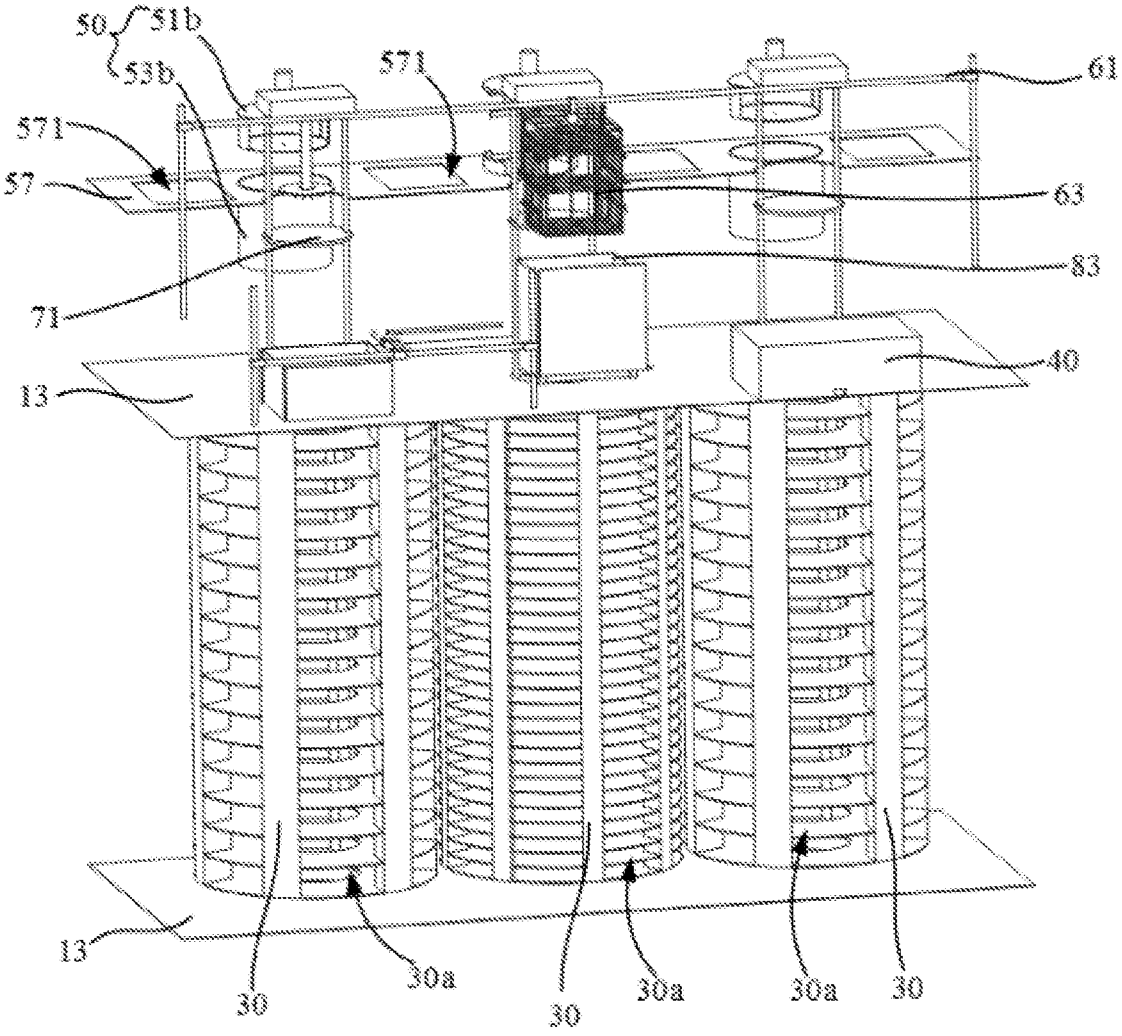
FIG. 2 is a structural schematic view of the automatic meals-selling machine shown in FIG. 1 with a casing and an electric control assembly removed.

Please refer to FIG. 1 and FIG. 2, in an embodiment, in order to further increase the storage capacity of the automatic meals-selling machine 100, a plurality of meals storage racks 30 are provided, for example, two, three or more than three storage racks 30 are provided. The plurality of meals storage racks 30 are provided side by side at intervals. Due to the special setting of the meals pickup assembly 70, a plurality of the meals pickup assemblies 70 are also provided and are provided in one-to-one correspondence with the meals storage racks 30, that is, inside the meals pickup passage 30*b* of the meals storage racks 30 are all provided with one meals storage piece 71 provided movably. The casing 10 is provided with a meals pushing piece 73 corresponding to the meals storage rack 30, so that a plurality of meals can be served at the same time, thereby improving meals delivery efficiency. Depending on the type of meals, the sizes of the plurality of meals storage racks 30 can be the same or different. At the same time, the setting of the plurality of meals storage racks 30 also provides the possibility to sell different meals combinations, for example, traditional flavored snacks are usually paired with at least two kinds of meals, for example, the combination of cold noodles and marinated meat in baked bun, that is, the traditional snacks in Shaanxi area.

Here, three meals storage racks 30 are provided in the casing 10, the storage space 30*a* of one meals storage rack 30 is smaller than the storage space 30*a* of the other two meals storage racks 30 and can be configured to store the baked buns of marinated meat in baked bun. However, the storage space 30*a* of other meals storage racks 30 is larger and can be configured to place meals of cold noodles, Chinese rolled dough and porridge and soup types, which can be eaten with the marinated meat in baked bun, thereby greatly improving the buyer's purchasing experience, and increasing the selectivity in purchasing meals. The automatic meals-selling machine 100 according to the present application includes a combination of a rotating meals storage rack 30, a lifting meals storage piece 71 and a telescopic meals pushing piece 73, which saves space. Compared with selling machines of similar volume on the market, the storage capacity of the automatic meals-selling machine 100 according to the present application is two to three times the storage capacity of the selling machines of similar volume on the market.

It can be understood that the heating assembly 50 is provided above the meals storage rack 30, during the up and down movement of the meals storage piece 71, the meals can be picked up in the meals pickup passage 30*b*, the meals can be moved into the heating cavity in the heating zone 10*a*. Here, the meals pickup assembly 70 further includes a meals push rod (not shown in figures), the meals push rod is telescopically provided at one side of the meals storage piece 71; and in response to that the meals storage piece 71 is flush with the meals inlet 51*a*51, 53*b*11, the meals push rod is configured to push meals on the meals storage piece 71 into the heating assembly 50 via the meals inlet 51*a*51, 53*b*11.

The structural settings of the meals push rod can be the same as structure of the above-mentioned meals pushing piece 73, which facilitates processing and can simplify the structure. The meals pushing direction of the meals push rod is opposite to the meals pushing direction of the meals pushing piece 73, the meals pushing piece 73 is provided on the rear panel 111 and pushes the meals from the storage space 30*a* toward the direction of the front panel onto the meals storage piece 71, the meals push rod is provided on the front panel, and in response to that the meals storage piece 71 is flush with the meals inlet 51*a*51, 53*b*11, pushing the meals toward the direction of the rear panel 111 into the meals inlet 51*a*51, 53*b*11 by the meals push rod. In this way, the heating assembly 50 is provided at the upper and rear position of the meals storage rack 30 and can be far away from the front panel, so that excessive heat will not be generated at the meals outlet, thereby improving the protection for users. Certainly, in other embodiments, the meals pushing piece 73 can also be provided at the front panel, and the meals push rod can be provided at the rear panel 111. In an embodiments, transfer components of other structures, such as manipulators or clamping components, is provided to transfer the meals to the heating assembly 50.

Please refer to FIG. 5, in an embodiment, the meals pickup assembly 70 further includes a hole puncher 79, the hole puncher 79 is fixed above the meals storage piece 71, and a surface of the hole puncher 79 facing towards the meals storage piece 71 is provided with a needle 791 to punch a hole in a packaging box of the meals on the meals storage piece 71.

In this embodiment, in order to further improve the heating effect, when the heating assembly 50 is in the steam heating mode, the corresponding meals pickup assembly 70 further includes the hole puncher 79, which is provided above the meals storage piece 71. Specifically, the hole puncher 79 can be provided on the driving component of the meals storage piece 71 and between the two screw rods 77; when the meals storage piece 71 moves up and down as the screw rod 77 rotates, the hole puncher 79 is fixed; when the distance between the meals storage piece 71 and the hole puncher 79 reaches a certain preset distance, the needle 791 of the hole puncher 79 can come into contact with the packaging box with meals and thereby punch a hole in the packaging box with meals and it can move downward to a position corresponding to the cover body 53*a* to push the packaging box with meals after the punching. In this way, during steam heating, the contact area between the steam and the meals can be increased, thereby making the heating of meals more efficient and having a better heating taste.

Please continue to refer to FIG. 5 and FIG. 6, in an embodiment, on the structural basis of the plurality of meals storage racks 30, in order to heat different meals in different ways or to improve the heating efficiency, a plurality of the heating assemblies 50 are also provided and are provided in one-to-one correspondence with the meals pickup assemblies 70. A heating method of the heating assembly 50 is at least two of the roasting heating, the water-bath heating and the steam heating.

In this embodiment, when two or more than two meals storage racks 30 and meals pickup assemblies 70 are provided, one of the heating methods and the types of meals are the same. In this way, a plurality of heating assemblies 50 are provided and are provided in one-to-one correspondence with the meals pickup assemblies 70; the structures of the plurality of heating assemblies 50 are all the same, for example, they are all the roasting heating for meals of cake types, or the water-bath heating for porridge and soups types, or the steam heating for cold noodles and Chinese rolled dough types. When a plurality of meals are purchased, the heating efficiency and meals delivery efficiency can be effectively improved, and user experience is improved.

Further, in order to provide a better purchasing experience, the automatic meals-selling machine 100 places different types of meals in different meal storage racks 30, which can satisfy the user's free choice of set menu of meals. Here, aiming at the matching habits of traditional snacks, the meals are set to be at least two of the porridge and soup types, marinated meat in baked bun types, cold noodles and Chinese rolled dough types, so the heating assembly 50 corresponds to at least two of roasting heating, water-bath heating or steam heating, to provide targeted heating methods, thus improving the taste of meals and user experience.

In an embodiment, when three meals storage racks 30 are provided, the three heating assemblies 50 are the heating structures of the above three heating methods, thereby providing more meals matching options, and ensuring heating effects. In this way, the vessel body 51*a*, 51*b* of the three heating assemblies 50 can be connected to the casing 10 by a connecting plate 57, and a certain distance is provided between the partition plate 13 and the top shell to facilitate heat dissipation. At the same time, between two adjacent vessel bodies 51*a*, 51*b*, the connecting plate 57 is provided with a heat dissipation hole 571 to dissipate the heat of the vessel body 51*a*, 51*b* upward via the heat dissipation hole 571, reducing the probability of being transferred to the cold storage zone 10*b*, which is more conducive to the preservation of meals and the heat dissipation of the heating zone 10*a*.

Figure 7:
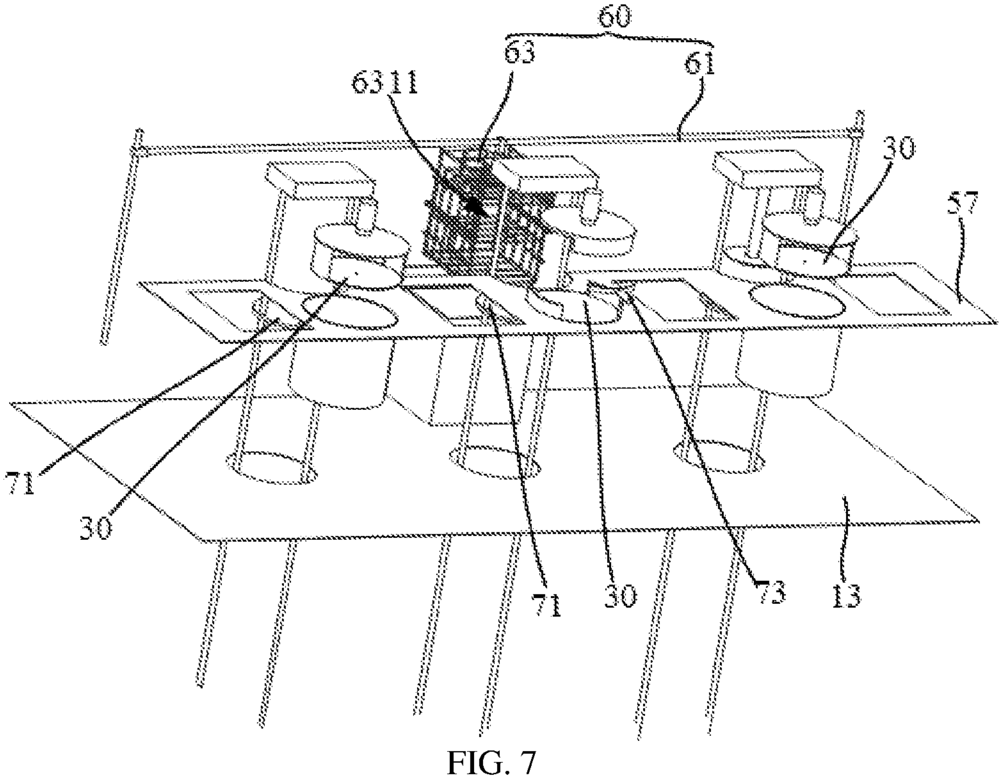
FIG. 7 is a structural schematic view of the heating assembly, the meals pickup assembly and a meals delivery-and-transfer device in the automatic meals-selling machine shown in FIG. 1.
Figure 8:
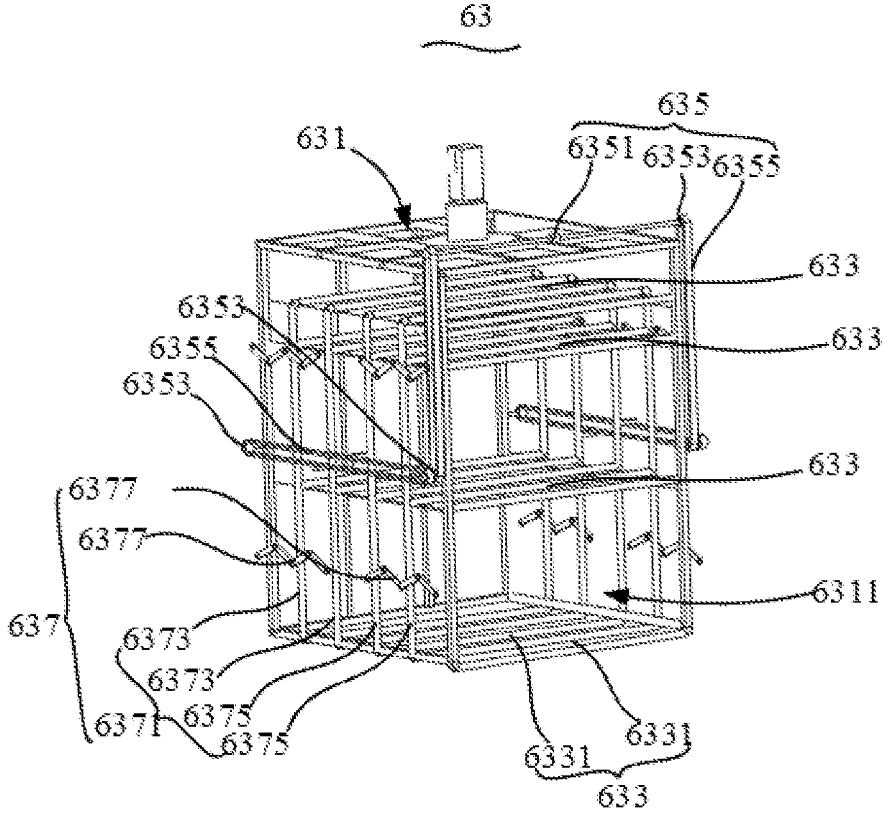
FIG. 8 is a structural schematic view of the meals delivery-and-transfer device in the automatic meals-selling machine shown in FIG. 1.
Figure 9:
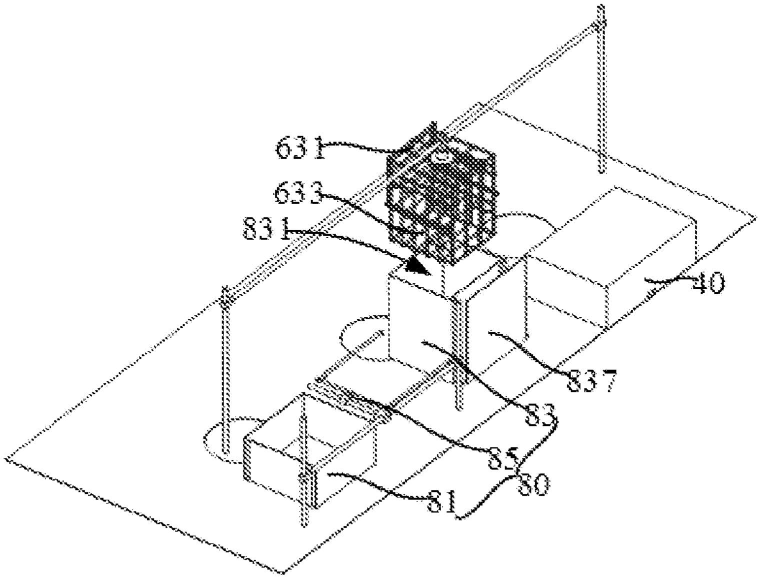
FIG. 9 is a structural schematic view of the meals delivery-and-transfer device and a packing device in the automatic meals-selling machine shown in FIG. 1.

Please combine FIG. 7 to FIG. 9, certainly, after completing the heating of the meals, the meals need to be transferred to the meals outlet, therefore, a meals pushing piece 73 is also provided on the side of the heating assembly 50 facing away from the meals storage piece 71; that is, the meals in the heating assembly 50 is pushed to the meals storage piece 71 and then is pushed to the meals outlet or other components that can receive and transfer by the meals storage piece 71. The meals pushing piece 73 has the same structure as the meals pushing piece 73 during the process of picking up meals, or the meals pushing piece 73 in the process of picking up meals is directly moved to a position flush with the heating assembly 50, thus realizing the function of pushing meals and transferring, further reducing components, simplifying the structure, and reducing material and processing assembly costs.

In order to better limit the position of meals, a meals delivery box 83 is generally provided at a position corresponding to the meals outlet, the meals delivery box 83 is provided with a meals delivery space 831, and the meals is pushed into the meals delivery space 831 to prevent the meals from falling to other locations. In an embodiment, the automatic meals-selling machine 100 is also provided with a meals delivery-and-transfer device 60, the meals delivery-and-transfer device 60 is provided between the meals pickup assembly 70 and the meals delivery box 83, and the meals delivery-and-transfer device 60 is configured to put the heated meals into the meals delivery box 83.

In this embodiment, a bracket 61 is configured to fix a cabin 63, the bracket 61 is connected to the outer shell 11, and the cabin 63 is specifically provided between the meals storage piece 71 and the meals delivery box 83 and is configured to receive heated meals and deliver the heated meals into the meals delivery box 83. The cabin 63 includes a frame body 631, the frame body 631 is roughly in the shape of a cuboid or a cube and is provided with six surfaces, a movable bottom plate 633 can be movably provided on the surface of the frame body 631, and the two cooperate to form a storage cavity. Certainly, the frame body 631 can also be a cylinder or other shape. The storage cavity is provided with a fixed opening 6311 facing towards the meals storage piece 71 for receiving meals. At the same time, the bracket 61 can drive the cabin 63 to lift up and down, so that it can move within the plane where the meals pickup assembly 70 is located and the meals delivery space 831 of the meals delivery box 83. In this way, a sensor is provided at the cabin 63; when the meals are detected to be put into the storage cavity, the cabin 63 is firstly moved downward into the meals delivery space 831, then the movable bottom plate 633 will automatically open the bottom surface of the frame body 631, thereby allowing the meals to fall into the meals delivery space 831. Here, the movable connection of the movable bottom plate 633 can be a rotational connection or a sliding connection, thereby enabling rotation or translation to open the bottom surface of the frame body 631, which is not limited here.

In this way, the cabin 63 can control the movable bottom plate 633 to open the bottom surface of the frame body 631 after entering the meals delivery space 831, so that the meals will not fall from a high place when the meal is delivered, ensuring the integrity of the meals effectively, improving the purchasing experience; and the transfer structure is simple and requires low driving precision of the movable bottom plate 633 and the cabin 63 to ensure fast meals delivery.

Please continue to refer to FIG. 8, in an embodiment, in order to facilitate control, the cabin 63 is provided with a driving assembly 635, the driving assembly 635 drives the movable bottom plate 633 to move, the driving assembly 635 may be a driving component such as an electrical machinery, a motor, a cylinder or the like, which is not limited here. Here, the movable bottom plate 633 is provided to be at least two bottom rods 6331, that is, at least two bottom rods 6331 constitute the movable bottom plate 633. The cross-sectional shape of the bottom rod 6331 can be circular, square or polygonal, etc., when it is round, it can make the meals fall more smoothly and improve the efficiency of meals delivery. When the bottom rods 6331 are evenly provided at intervals on the bottom surface of the frame body 631, they can play a role in supporting meals; when some of the plurality of bottom plates 51*a*3 are collectively moved toward one side of the frame body 631, the remaining part of the plurality of bottom plates 51*a*3 are moved toward another side of the frame body 631, the bottom surface of the frame body 631 can be opened, and the meals can fall out. The movable bottom plate 633 of this structure can provide relatively stable support, and does not occupy additional space while opening the bottom surface, which can reduce the volume of the meals delivery-and-transfer device 60, thus making the automatic meals-selling machine 100 occupy a smaller space.

Please refer to FIG. 8 again, in an embodiment, in order to reduce the impact of the driving assembly 635 on the smooth transfer of meals, the cabin 63 further includes a movable side plate 637. The structure of the movable side plate 637 and the structure of the movable bottom plate 633 are the same and both include at least two side rods 6371. Each side plate 51*a*5 is connected to the end of one bottom rod 6331, the driving assembly 635 is provided at the side of the frame body, and part of the side rods 6371 of the driving portion 6351 moves toward one side of the frame body 631. The remaining side rods 6371 move toward another side of the frame body 631, thereby driving a plurality of bottom rods 6331 to move to open the bottom surface of the frame body 631, thus realizing the transfer of meals. The structure prevents the bottom rod 6331 of the movable bottom plate 633 from being interfered by other structures, which can make the meals slide down more smoothly and improve the meals delivery effect.

In an embodiment, the side rod 6371 moving towards the side of the frame body 631 is provided as the first side rod 6373, and the side rod 6371 moving toward the opposite side is provided as the second side rod 6375. In order to further simplify the structure of the cabin 63 and reduce the number of drive assemblies 635, a telescopic piece 6377 is configured to connect two adjacent side rods 6371 moving toward the same side. When the movable bottom plate 633 needs to carry meals, the telescopic piece 6377 can extend to maintain a distance between two adjacent side rods 6371; when delivering food, the telescopic piece 6377 can be contracted or folded when the side rod 6371 is moving, so as to reduce the distance between the two side rods 6371. When the driving assembly 635 drives the first side rod 6373 located in the middle position, the first side rod 6373 compresses the telescopic piece 6377 to reduce the distance between the first side rod 6373 and the adjacent first side rod 6373 until the adjacent first side rod 6373 is pushed and moved, and so on, thereby realizing the open state of the movable bottom plate 633. The setting of this structure is similar to a device for opening and closing curtains, there is no need for each side rod 6371 to be provided with a driving assembly 635, so that the purpose of quickly opening or closing the side of the frame body 631 and bottom of the frame body 631 can be achieved with fewer driving assemblies 635, thereby effectively saving material costs and energy consumption. The telescopic piece 6377 can be two metal bars that are hinged to each other, and the two metal bars are also hingedly connected to the side rods 6371 connected to them respectively; certainly, it can also be a structure such as a telescopic rod, which is not limited here.

Please refer to FIG. 8, in an embodiment, in order to further reduce energy consumption, the driving assembly 635 includes a driving portion 6351, and the driving portion 6351 may be an electrical machinery or a motor, etc. The driving portion 6351 further includes a transmission wheel 6353 and a transmission belt 6355, the driving portion 6351 drives the transmission belt 6355 to rotate, the two opposite moving surfaces of the transmission belt 6355 face towards different directions respectively. Therefore, one of the first side rods 6373 and the second side rods 6375 provided adjacent is connected to one surface of the transmission belt 6355 and the other one is connected to another surface of the transmission belt 6355. Under the driving of the driving portion 6351, and the first side rod 6373 and the second side rod 6375 are driven to move by the transmission belt 6355 to realize the opening of the movable bottom plate 633.

In an embodiment, in order to transfer more meals at one time, a plurality of bottom plates 633 can be provided. The plurality of movable bottom plates 633 are provided at intervals in a direction from the bottom surface of the frame body 631 to the top surface of the frame body 631, thereby dividing the storage cavity into a plurality of layers, each layer can store meals, thus effectively increasing the storage capacity of meals.

Please combine FIG. 7 and FIG. 8, when a plurality of meals storage racks 30 are provided, the plurality of the meals storage racks 30 are arranged side by side in the accommodation space at intervals. A plurality of the meals pickup assemblies 70 are provided and are provided in one-to-one correspondence with the meals storage racks 30, and a plurality of the heating assemblies 50 are provided and are provided in one-to-one correspondence with the meals pickup assemblies 70, so as to send the meals on each meal storage rack 30 to the corresponding heating assembly 50 by the corresponding meals pickup assembly 70, thereby realizing targeted heating methods for different meals, and improving meals delivery efficiency and the taste of meals.

In this embodiment, since a plurality of meals need to be delivered together, in order to improve the meals delivery efficiency, the bracket 61 is extended along the arrangement direction of the meals storage rack 30, and the cabin 63 can be provided movably along the extending direction, that is, the cabin 63 can be provided movably among a plurality of meals storage racks 30 and a plurality of heating assemblies 50. Specifically, the moving method can be a driving structure in which the motor is combined with the screw rod 77, or other structures such as a conveyor belt can be selected for driving. The setting of this structure allows that when the user selects at least two meals, the cabin 63 moves to at least two heating assemblies 50, after receiving the corresponding meals; when the plurality of movable bottom plates 633 are provided, putting different meals on the movable bottom plates 633 of different layers; at this time, the storage cavity can be divided into spaces of different sizes according to the volume of meals to reduce the accumulation or squeezing of meals while meeting the storage needs of meals, thus ensuring the integrity and appearance of meals, and improving the purchasing experience. When only one movable bottom plate 633 is provided, the meals can be placed on the same movable bottom plate 633 and transferred together, and the structure is simple.

Please refer to FIG. 7, in an embodiment, the structure of the meals pushing piece 73 for pushing the meals into the movable bottom plate 633 can be the same as the structure of the meals pushing piece 73 for pushing the meals into the meals storage piece 71, or the above two meals pushing pieces 73 are combined into one. That is, the transmission structure for driving the meals pushing piece 73 has its two ends connected to the bottom shell 117 and the top shell, as a result, the meals pushing piece 73 can move in the cold storage zone 10*b* and the heating zone 10*a*, thus realizing two processes of meals push actions, thereby effectively reducing the number of driving components and meals pushing pieces 73, and simplifying the structure and reducing processing costs.

Figure 10:
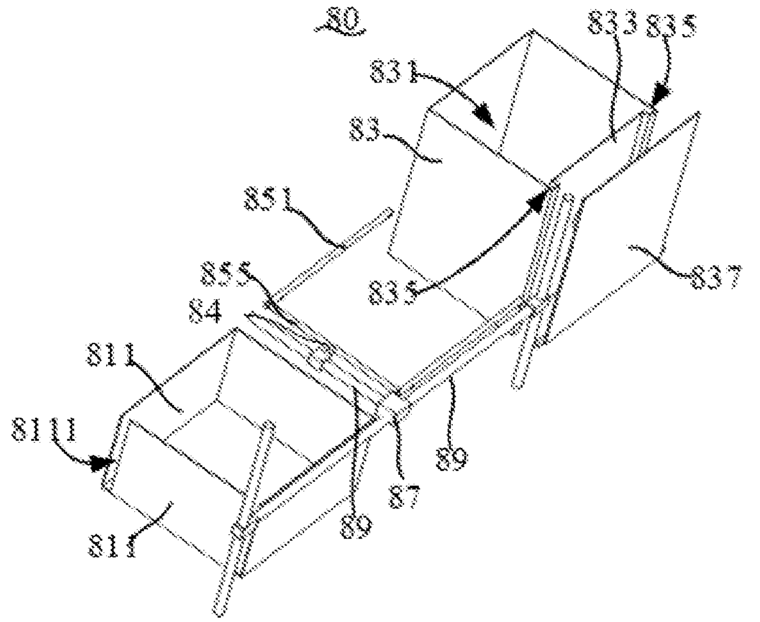
FIG. 10 is a structural schematic view of the packing device in the automatic meals-selling machine shown in FIG. 1.

Please refer to FIG. 9 and FIG. 10, since the meals will be hot to a certain extent after being heated, after the automatic meals-selling machine 100 includes the meals pickup assembly 70, the meals storage rack 30 structure and the heating assembly 50 with the above structure. In an embodiment, the automatic meals-selling machine 100 further includes a packaging device 80, and the packing device 80 is provided at one side of the meals delivery box 83 and is configured to put packaging bags into the meals delivery space 831 to package meals.

In this embodiment, in order to adapt to traditional flavored snacks and meals, the packaging of the automatic meals-selling machine 100 is different from existing fast food boxes; the meals do not have packaging that can be easily carried, and based on the fact that the meals will be slightly hot to the touch after being heated, a packaging device 80 is provided, which can automatically pick up the packaging bags and put the packaging bags into the meals delivery space 831; the meals placed in the meals delivery space 831 from the cabin 63 of the meals delivery-and-transfer device 60 is packaged, and the user can directly lift the packaging bag when picking up the meals without directly touching the meals, thereby reducing the chance of being burned and effectively improving the consumer experience. At the same time, on the structural basis with or without heating assembly 50, the structure of the plurality of meals storage racks 30 is provided; when a plurality of meals are delivered at the same time, the cabin 63 can greatly improve the meals delivery efficiency, and the packing device 80 can also pack a plurality of meals, which is a good solution to the situation where it is inconvenient to carry due to the large variety of meals when purchasing a plurality of different meals at the same time, thus increasing the chance of purchasing a variety of set menu of meals, which are also healthier and more hygienic, thus improving convenience and safety.

Figure 11:
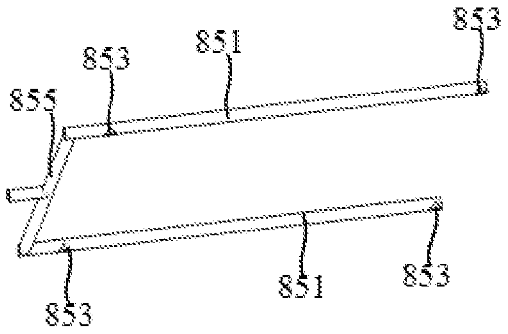
FIG. 11 is a structural schematic view of a support arm and a connecting arm in the packing device shown in FIG. 10.

Please combine FIG. 10 and FIG. 11, in an embodiment, in order to realize automatic packaging of the packaging device 80, the packaging device 80 is electrically connected to the electric control assembly 90, and the packaging of meals is realized by the control of the electric control assembly 90. Specifically, the packing device 80 includes a fixed base and a bag storage box 81 fixed relative to the fixed base. The fixed base can be provided separately and be fixed on the partition plate 13, or the fixed seat can be defined as the above-mentioned partition plate 13 structure. The bag storage box 81 is directly fixed at the side of the meals pickup assembly 70 close to the front panel for storing packaging bags. The shape of the bag storage box matches the shape of the packaging bag. In order to increase the storage capacity of packaging bags, the packaging bag is in a folded state, and the plurality of packaging bags are stacked and pressed in the bag storage box 81. Here, the material of the packaging bag can be paper, which is environmentally friendly, healthy and relatively low-cost and can reduce white waste pollution. Certainly, in other embodiments, plastic materials or other materials can also be used.

The meals delivery box 83 is the structure of the meals delivery box 83 described above, and is provided directly opposite the meals outlet to facilitate the user to pick up meals via the meals outlet. In an embodiment, the opening shape of the meals delivery box 83 matches the open state of the packaging bag, and the bag pickup piece 85 is movably provided relative to the fixed seat. That is, the bag pickup piece 85 is movably provided on the partition plate 13, therefore, the bag pickup piece 85 can move back and forth between the bag storage box 81 and the meals delivery box 83, and can also open the packaging bag in folded state to package the meals. Specifically, the bag pickup piece 85 can be a manipulator, an adsorption piece or the like.

Please combine FIG. 10 and FIG. 11, in an embodiment, taking the packaging bag as a paper bag as an example, the paper bag has better flatness. The bag pickup piece 85 includes a support arm 851 and a sucker 853 provided at the support arm 851, the sucker 853 is connected to an air tube and the air tube is connected to a vacuum pumping device (not shown in figures), which can absorb and fix the packaging bag. The support arm 851 is movably provided relative to the bag storage box 81 and the meals delivery box 83, that is, driven by the driving components, the movement in the vertical direction, the movement in the left and right directions, and the movement in the front and rear direction can be realized, thereby realizing the transfer of the packaging bag.

In an embodiment, in order to improve the stability of the bag pickup piece 85 for absorbing packaging bags, the bag pickup piece 85 further includes a connecting arm 855, two supporting arms 851 are provided and are respectively connected to both ends of the connecting arm 855, thereby increasing the contact area between the sucker 853 and the packaging bag, and effectively improving the adsorption stability. Certainly, a plurality of suckers 853 can be provided on each support arm 851, thereby further improving the adsorption capacity of the bag pickup piece 85, and preventing the packaging bag from falling during the transfer process. Here, the support arm 851 of the bag pickup piece 85 is provided between the bag storage box 81 and the meals delivery box 83, and the support arm 851 is facing towards the meals delivery box 83. That is, the connecting arm 855 is facing towards the bag storage box 81, the bag pickup piece 85 can be translated in the direction facing towards the bag storage box 81 and then moved downward, so that the sucker 853 absorbs and fixes the packaging bag, then moves upward to leave the bag storage box 81, and then moves toward the meals delivery box 83. Since the opening of the meals delivery box 83 faces upward, in order to reduce the interference between the bag pickup piece 85 and the meals delivery-and-transfer device 60, the meals delivery box 83 needs to be rotated, so that the meals delivery box 83 rotates 90 degrees with the center axis perpendicular to the front panel as the axis, that is, rotates 90 degrees counter-clockwise, thus making the opening of the meals delivery box 83 face toward the support arm 851. At the same time, the support arm 851 is provided to be rotatable, the support arm 851 rotates 90 degrees around the rotation axis 84 to make its size matches the opening size of the meals delivery box 83, thus enabling the end of the support arm 851 to enter the meals delivery space 831 to put the packaging bag into the meals delivery box 83, which is simple and convenient and effectively improves the efficiency of transferring the packaging bag.

Please refer to FIG. 10 again, in an embodiment, in order to facilitate the bag pickup piece 85 to pick up bag, an insertion hole 8111 is provided on one side of the bag storage box 81, and the insertion hole 8111 is adapted to the size of the support arm 851. When the bag pickup piece 85 moves to the bag storage box 81 to pick up bag, the bag pickup piece 85 is located above the bag storage box 81. The connecting arm 855 corresponds to the outside of the bag storage box 81, and the support arm 851 corresponds to the inside of the bag storage box 81. Then the bag pickup piece 85 is driven to move downward, and the support arm 851 enters the bag storage box 81 via the insertion hole 8111 and the opening to adsorb and fix the packaging bag.

In an embodiment, in order to achieve a better fixing effect, the fixing portion provided at the meals delivery box 83 is a sucker 853. The sucker 853 is also connected to a vacuum pumping device, thereby, the adsorption and release of the packaging bag can be realized under the control of the controller 93. Here, when the bag pickup piece 85 puts the packaging bag into the meals delivery space 831, the bag pickup piece 85 moves to the place where the fixing portion adsorbs the other surface of the packaging bag facing away bag pickup piece 85. In this way, the bag pickup piece 85 then moves in reverse direction so that the packaging bag opens under the dragging of the fixing portion and the support arm 851, the bag pickup piece 85 moves to the side opposite to the meals delivery box 83. Here, both sides of the meals delivery box 83 are provided with fixing portions; that is, when the fixing portions are also ventilated to absorb the packaging bags, the bag pickup piece 85 can close the ventilation to release the adsorption of the packaging bags, and then withdraws from the meals delivery box 83 and returns to a state of waiting for bag pickup. Then, the meals delivery-and-transfer device 60 puts the meals from its storage cavity into the packaging bag to complete the packaging.

Please refer to FIG. 10, when the fixing portions are provided on both opposite sides of the meals delivery box 83, one side of the meals delivery box 83 can be convexly formed with a protrusion 833, and the protrusion 833 can be enclosed with an adjacent side to form an avoidance groove 835; when the support arm 851 moves to this side, the packaging bag abuts the protrusion 833 and is fixed by the fixing portion on the protrusion 833, and the support arm 851 can be located in the avoidance groove 835, thereby facilitating the withdrawal of the support arm 851 and improving the transfer efficiency.

In order to facilitate picking up meals, in an embodiment, since the opening of the meals delivery box 83 faces upward, the meals delivery box 83 can also be provided rotatably relative to the fixed base; that is, the partition plate 13 is provided to be rotatable. The rotation here is the rotation that relative to the casing 10 facing towards the front panel, so that the opening of the meals delivery box 83 is exposed at the meals outlet, which facilitates users to directly pick up meals and improves the convenience of picking up meals. When the meals pickup is completed, the meals delivery box 83 automatically returns back into the casing 10 and can seal the meals outlet to prevent external dust from entering and contaminating the meals, thereby improving safety.

Please combine FIG. 9 and FIG. 10, in order to improve the dining experience, the automatic meals-selling machine 100 is also equipped with a tableware storage box 40. A tableware is placed in the tableware storage box 40, and the user can manually press and take out the tableware when needed, or the tableware is automatically pushed out for the user to use after picking up the meal.

The meals delivery box 83 is provided to be rotatable relative to the partition plate 13 to facilitate the placement of packaging bags. A baffle 837 is connected to the surface of the meals delivery box 83 facing towards the meals outlet, and a gap is provided between the baffle and the meals delivery box 83 to facilitate the placement of components that drive the meals delivery box 83 to rotate. The baffle 837 is provided to be able to close the meals outlet, that is, the baffle 837 matches the size and shape of the meals outlet; the baffle 837 can be rotatably provided relative to the casing 10 driven by the driving components, so that when meals need to be delivered, the baffle 837 flips toward the outside of the casing 10, thus causing the meal box to also rotate, so that the opening of the meals delivery box 83 is exposed, making it convenient to pick up meals.

The above are only some embodiments of the present application, and are not intended to limit the scope of the present application. Under the concept of the present application, any equivalent structure transformation made by using the description and accompanying drawings of the present application, or directly or indirectly applied in other related technical fields, is included within the scope of the present application.

What is claimed is:

1. A heating assembly applied to an automatic meals-selling machine for heating meals, wherein the automatic meals-selling machine comprises a casing and a meals pickup assembly provided in the casing, the meals pickup assembly is configured to send the meals to the heating assembly, the heating assembly comprises:

a vessel body provided with a space accommodating meals to be heated;

a cover body movably provided relative to the vessel body to cover or open the vessel body, wherein the cover body and the vessel body are configured to cover together to form a heating cavity; and a heating body provided at the vessel body and/or the cover body for achieving at least one of roasting heating, water-bath heating or steam heating;

wherein one of the vessel body and the cover body is provided with a meals inlet to allow the meals pickup assembly put the meals into the one of the vessel body and the cover body via the meals inlet;

wherein in response to that the heating assembly adopts the roasting heating, the vessel body is formed with a heating tank, a tank wall of the heating tank is provided with the meals inlet, and the heating body is provided on a surface of the vessel body facing away from the heating tank and/or inside the cover body.

2. The heating assembly according to claim 1, wherein the vessel body comprises a bottom plate and a side plate provided at a periphery of the bottom plate, and the bottom plate and the side plate are enclosed to form the heating tank; the side plate is provided with the meals inlet, and the cover body comprises a cover plate and a coaming plate provided at a periphery of the cover plate; the coaming plate is provided with an avoidance hole, and the cover body is configured to cover with the vessel body; the side plate correspondingly is configured to cover the avoidance hole, and the coaming plate is configured to correspondingly cover the meals inlet.

3. The heating assembly according to claim 1, wherein in response to that the heating assembly adopts the steam heating or the water-bath heating, the vessel body is a tube structure with one end open; the heating body is provided at the vessel body, and the vessel body is filled with a preset capacity of water; the cover body is provided with a meals storage portion facing towards the vessel body, the meals storage portion is provided with the meals inlet, and the meals storage portion is provided above the water or immersed in the water.

4. The heating assembly according to claim 3, wherein the cover body further comprises a top cover, and the meals storage portion is a tube structure with one end open; the top cover is configured to cover and connect with an edge of an opening of the meals storage portion, and a circumferential side of the meals storage portion is provided with the meals inlet; a height of the meals storage portion is smaller than a depth of the vessel body.

5. The heating assembly according to claim 3, wherein a surface of the meals storage portion facing towards a bottom of the vessel body is provided with a plurality of micropores, and the plurality of the micropores are provided at intervals.

6. An automatic meals-selling machine, comprising:

a casing formed with a heating zone, a cold storage zone and an electronic control zone provided sequentially in a vertical direction;

a meals storage rack provided in the cold storage zone and provided with a plurality of storage spaces;

the heating assembly according to claim 1, wherein the heating assembly is provided at the heating zone;

a meals pickup assembly movably provided between the cold storage zone and the heating zone to take out meals in the storage space and send the meals in the storage space into the heating assembly via the meals inlet for heating; and an electric control assembly provided at the electric control zone and electrically connected to both the heating assembly and the meals pickup assembly;

wherein the meals pickup assembly comprises a meals storage piece and a meals push rod; the meals storage piece is vertically movable relative to the meals storage rack, and the meals push rod is telescopically provided at one side of the meals storage piece; in response to that the meals storage piece is flush with the meals inlet, the meals push rod is configured to push meals on the meals storage piece into the heating assembly via the meals inlet.

7. The automatic meals-selling machine according to claim 6, wherein the meals pickup assembly further comprises a hole puncher, the hole puncher is fixed above the meals storage piece, and a surface of the hole puncher facing towards the meals storage piece is provided with a needle to punch a hole in a packaging box of the meals on the meals storage piece.

8. The automatic meals-selling machine according to claim 6, wherein a plurality of the meals storage racks are provided, and the plurality of the meals storage racks are arranged side by side in the cold storage zone at intervals; a plurality of the meals pickup assemblies are provided and are provided in one-to-one correspondence with the meals storage racks, and a plurality of the heating assemblies are provided and are provided in one-to-one correspondence with the meals pickup assemblies; a heating method of the heating assembly is at least two of the roasting heating, the water-bath heating and the steam heating; and/or the heating assembly further comprises a supply portion, and the supply portion is provided at the electronic control zone and is connected to the vessel body and/or the cover body by a pipe or a wire to realize a heating function of the vessel body and/or a heating function of the cover body.

* * * * *